ELECTRICAL SHIELDING STRUCTURE

Filed Aug. 28, 1964

INVENTOR.
KNUT BUSET

BY Flehr & Swain
ATTORNEYS

United States Patent Office 3,253,082
Patented May 24, 1966

3,253,082
ELECTRICAL SHIELDING STRUCTURE
Knut Buset, Orinda, Calif., assignor to Nova Industries, Inc., San Leandro, Calif., a corporation of California
Filed Aug. 28, 1964, Ser. No. 392,807
7 Claims. (Cl. 174—35)

This invention relates generally to electrical shielding structures and more particularly to electrical shielding panels and shielding clips therefor.

Electrical interference, such as radio frequency interference, is especially caused by the sparking and arcing of contacts of switches, relays and commutators of various kinds. Such interference may also be caused by electronic switches such as thyratons and other gas discharge devices including fluoroescent lighting fixtures. To prevent such radio frequency interference from generating undesired signals in electronic apparatus it is found necessary to interpose suitable shielding means between the source of undesired interference and the before-mentioned electronic apparatus. One such shielding means useful to provide electrical shielding is metallic honeycomb. The metallic or conductive honeycomb material is comparable to an array of wave guides which, if properly designed as a cell depth and opening, will attenuate the passage of high frequency electrical signals. However, when such shielding materials are provided in shielding panels and supported in a grid structure it is difficult to form a good conductive relationship between the panels and all along the edges thereof, to ensure that no high frequency interference signals pass through gaps between panels or between a panel and a grid member. There is, therefore, a need for a new and improved electric shielding structure.

In general, it is an object of the present invention to provide a shielding structure which overcomes the above named disadvantages.

Another object of the invention is to provide a unitary electrical shielding structure of the above character which has a good conductive relationship throughout.

Another object of the invention is to provide a shielding structure of the above character which shields from interference radiation propagated from electrical lighting fixtures.

Another object of the invention is to provide an electrical shielding structure of the above character which can be easily and effectively installed.

Another object of the invention is to provide an electrical shielding structure of the above character which includes panel members that are readily removable therefrom.

Another object of the invention is to provide an electrical shielding structure of the above character in which there are a minimum of soldered connections.

Another object of the invention is to provide an electrical shielding structure of the above character which includes shielding panels in which the means forming the conductive and shielding relationship between the panels is concealed from view.

A further object of the invention is to provide a particularly novel shielding clip for use in the shielding structure.

Additional objects and features of the invention will appear from the following description in which the preferred embodiment is set forth in detail in conjunction with the accompanying drawing.

Referring to the drawing.

Figures 1, 3:
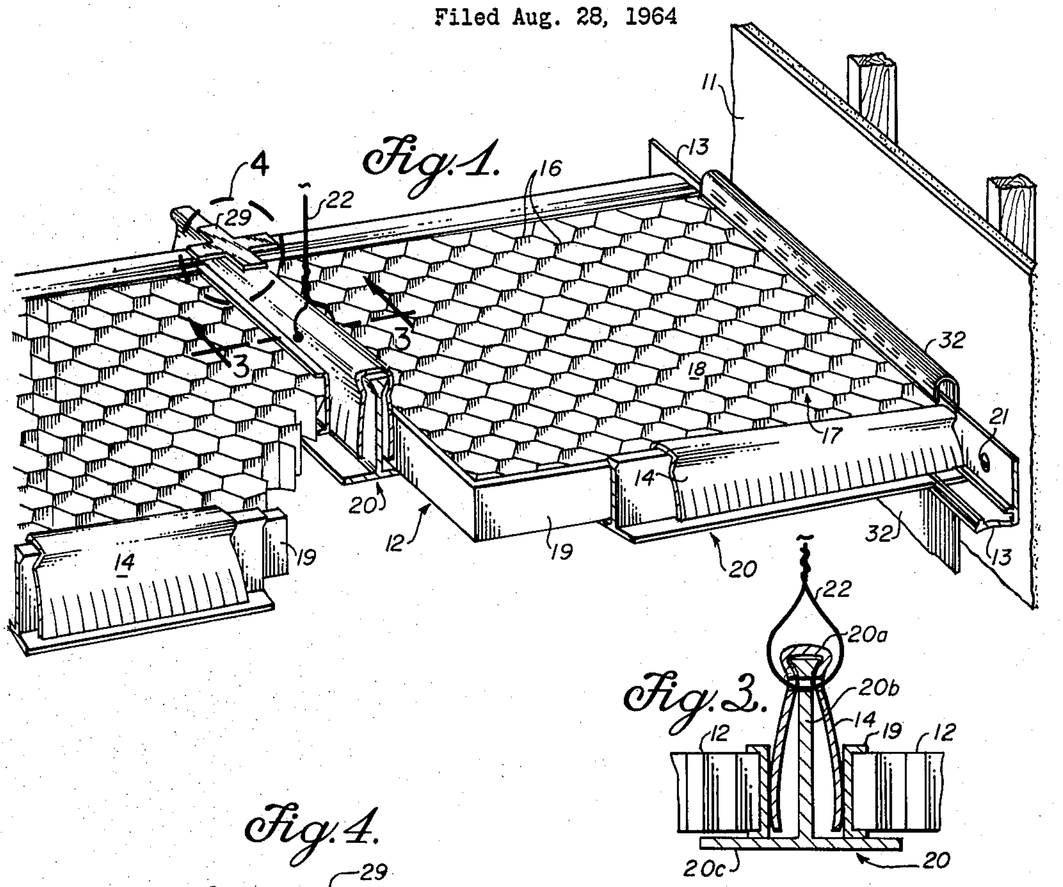
FIGURE 1 is an isometric view of a shielding structure incorporating my invention mounted in a room and, in particular, shows honeycomb panels supported in a grid structure with means for electrically interconnecting the same to form the shielding structure.
FIGURE 3 is an enlarged cross sectional view taken along the lines 3—3 of FIGURE 1 and shows the cooperation between a shielding clip and the associated shielding panels.
Figure 4:
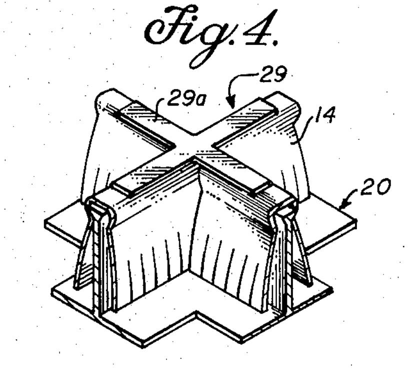
FIGURE 4 is an enlarged detail view of the portion circled in line 4—4 of FIGURE 1 and shows means for interconnecting the shielding clips at a junction between grid members.

In general, my shielding structure consists of a plurality of grid support members arranged to form a rectangular lattice within which are disposed shielding panels. The panels are electrically interconnected along their outer perimeters by shielding clips or members which establish a conductive relationship between the panels.

More particularly, as shown in the drawing, electrical shielding structure is horizontally disposed and forms a right angle with a vertical side wall 11 which may be considered as one side wall of a room having other conventional walls such as additional side walls and a floor and ceiling (not shown). The electrical shielding structure consists of conductive honeycomb panels 12 which are mounted in openings formed by a grid support structure 13. The panels are brought into unitary electrical contact by elongate conductive clip members 14, carried by the grid structure as hereinafter described.

The honeycomb panels 12, are of a conventional type and are formed of thin metal ribbons 16 which are bonded together by suitable means at the honeycomb nodes to provide a honeycomb structure 17 having spaced parallel upper and lower planar surfaces with polygonal openings 18 extending in a direction perpendicular to the planar surfaces. The ribbons 16 can be made of stainless steel or sheet aluminum. The bonding means can be a conductive epoxy in the case of aluminum or spot welding in the case of stainless steel. Aluminum honeycomb may be coated with cadmium or copper to provide positive electrical contact between the ribbons of sheet metal forming the honeycomb. The honeycomb structure 17 is mounted in a rectangular frame 19 of conductive metal which can be crimped over the outer marginal edges of the honeycomb structure 17 or can be even more securely bonded to the honeycomb structure by a suitable conductive bonding material such as silver solder or highly conductive epoxy cement to form the complete honeycomb panel 12.

While I have disclosed and shown in the drawing a particular application of my invention with particular reference to shielding panels constructed of conductive honeycomb shielding material, I wish it to be understood that the description and drawing of such honeycomb material is not intended to be in any sense limiting, but only illustrative of a material which is particularly adapted for application in my invention. My invention is designed and constructed to form an integrated shielding system from any suitable shielding material. Examples of other suitable shielding materials include metal coated glass, metal coated plastics or any material that shields against transmissions of electromagnetic radiation but may transmit light radiation and/or air.

The grid support structure 13 for supporting the panels 12 in a generally planar array consists of interconnected elongate support members 20. The support members 20 may be made of aluminum, wood or other structural material. The members 20 are mechanically interconnected at their intersections by suitable conventional means such as by mechanical clips (not shown).

Suitable means is provided for supporting the grid structure 13 and consists of screws 21 which secure the outer margin of the support structure 13 to the wall 11.

Wires 22 may also serve to support the grid support structure 13 and may be suspended from other structures such as the ceiling (not shown). If desired, it is obvious that the grid support structure 13 may be supported from its underside.

The support members 20 are generally made in the shape of inverted T or T-bulb with an enlarged upper or bulb portion 20*a*, web portion 20*b*, and a flange portion 20*c*, which serve to provide support for the panels 12 when the T-bulb is inverted as shown in the drawing. At the perimeter of the planar array of panels the support members 20 are made in angle shape to have only one wing of the flange portion 20*c*, and are thus rendered accessible for attaching to the wall 11 or other lateral support.

Means is provided for forming the panels 12 into a conductive unitary shielding structure. This means consists of a plurality of elongate clip members 14 removably mounted on the support members 20 of the grid structure and engaging the outer margins or perimeter of the panels 12. Each of the shielding clip members 14 is formed of a suitable conductive spring-like material such as spring sheet metal. It has a plurality of spring-like fingers 23 yieldably engaging the outer surfaces of the frames 19 of the panels 12, to form a positive electrical contact between the panels and the clip members. The spring sheet metal can be made of brass or spring tempered copper and may be plated with a highly conductive material such as tin to provide enhanced conductivity.

Figure 2:
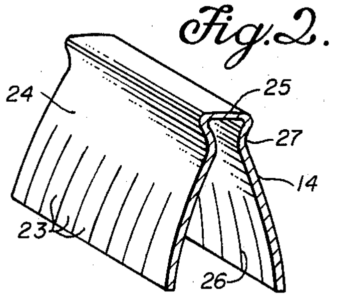
FIGURE 2 is an isometric view showing a portion of a shielding clip used in my shielding structure.

As shown in FIGURE 2 the clip member 14 may have a generally U-shaped conformation with a back portion 25 and a pair of integral side wall portions 24. The side wall portions 24 of the shielding member are provided with a plurality of transverse cuts or slots 26 extending inwardly from the free edge thereof to form a plurality of conductive fingers 23 in the side-wall portion 24.

A bend line 27 is provided between the back portion 25 and each side-wall portion 24 to form an area of reduced cross section which is adapted to clip over an enlarged bulb portion 21*a* of the grid support member 21. The back portion 25 of the clip 14 and the bulb portion 21*a* of the support member 21 are generally formed in a mated cross sectional shape so that the clip 14 is removably retained upon and can be snapped in place over the support member 21.

Means is provided for establishing electrical contact between intersecting shielding clip members 14 and consist of a cross-shaped shorting bar 29, having fingers 29*a* which are brought into electrical contact with the ends of the clip members 14 by suitable means such as brazing. The shorting bar 29 may be formed of the same material as the shielding clip member 14 or some other conductive material.

Means is provided for establishing conductive relationship between the shielding clip members 14 and a desired reference potential and consists of conductive wires 22 attached to various locations on the shielding clip members. Conductive relation between the reference potential and the shielding clips may be established by other means such as by copper sheet 32 which can be mounted along the wall 11 of the room to provide a completely shielded enclosure. The copper sheet is folded over and conductively attached to the side of the honeycomb panel at the frame 19, and also upon the ends of the shielding clip members 14 which terminate at the wall 11. When the copper sheet is attached in this manner it is unnecessary to have a shielding clip member 14 placed between the grid support member adjacent the wall and the side of the honeycomb frame 19 adjacent thereto.

The honeycomb structure 17 is a very suitable shielding material since it offers over 90% open area and negligible impedance to air flow. These properties make it exceptionally useful for use in air conditioning or heating ducts which must be sealed off to prevent the through transmission of radio frequency interference. In addition, honeycomb materials are light in weight and provide desirable characteristics for the passage of light. For example, when installed as a false ceiling below a plurality of light fixtures, such honeycomb materials when combined with the shielding clip members described above allow the transmission of light in a very desirable manner while attenuating any electrical radiation generated in the light fixtures which may cause electrical interference.

The positive interconnections which are made by the shielding clip members herein described greatly enhance the attenuation properties of shielding panels by forming them into a ground plane. The spaces between such panels are completely covered by the conductive material of the shielding clip members insuring that no leakage path exists between panels to permit the transmission of any undesired electrical interference radiation.

An additional advantage of my invention is seen in that the grid members need not be made of conductive material but may be constructed of nonconductive material such as wood, and yet the shielding properties will not be affected because the clips members form the sole means for electrically interconnecting the shielding panels.

Although a specific embodiment of this invention has been shown and described it will be understood that it is merely illustrative and that various modifications may be made therein without departing from the scope and spirit of this invention.

I claim:

1. In an electrical shielding structure, a grid-like support structure having a plurality of support members for supporting panels therebetween, electrical shielding panels mounted in said grid-like structure to extend between the members thereof so that the edges of the panels lie adjacent the members of the grid-like structure, a plurality of elongate electrical shielding clip members secured to said grid-like support members, each of said clip members being formed of a conductive spring-like material and having a generally U-shaped conformation in cross-section with spaced sidewall portions, the sidewall portions extending downwardly on each side of the support member, the outer side of the sidewall portions yieldably contacting the outer edges of the shielding panels next adjacent thereto so that the sidewall portions of the clip member are compressed towards each other by the outer edges of the panels to thereby establish a good electrical contact between the panels and through the clip member.

2. A shielding structure as in claim 1 in which the sidewall portions have a plurality of spaced cuts extending inwardly from the free edges thereof to form individual conductive spring-like fingers yieldably engaging the edges of the panels next adjacent thereto.

3. A shielding structure as in claim 1 wherein each of the panels is formed with a frame having outer planar surfaces and wherein the side wall portions of the clip members lie in planes generally parallel to the outer planar surfaces of said frame so that said spring-like fingers engage said frame outer surfaces.

4. A shielding structure as in claim 1 in which the members of said grid-like structure have an enlarged upper portion and in which each of the shielding clip members is formed so that it is substantially U-shaped in cross-section to provide a semi-enclosed cylindrical back portion, said back portion being adapted to snap over the enlarged upper portion of said grid structure to thereby retain said clip to the structure.

5. In an electrical shielding structure for use in a room having a ceiling, a grid-like support structure mounted adjacent the ceiling and including a plurality of support members arranged in a planar array and having means for supporting the outer margins of panels placed in the array, electrical shielding panels mounted in said grid-like structure to extend between the members thereof so that the outer margins of the panels lie adjacent a member of the grid structure and spaced a short distance from the next adjacent panel, each of said members of said grid-like structure having an enlarged upper portion, a plurality of elongate electrical shielding clip members, each of said clip members being formed of a conductive spring-like material and having a generally U-shaped conformation in cross-section with spaced sidewall portions and a back wall portion joining the side portion, said back wall portion being integral and connected with the sidewall portions to form an area of reduced transverse cross-section so that said back wall portion is semi-enclosed and adapted to be sprung apart so that the clip members may be snapped over the enlarged upper portion of the grid-like support members for removable engagement thereon, said sidewall portions extending downwardly between the shielding panels and the support members, each of said sidewall portions having a plurality of spaced parallel transverse cuts extending from the free edge thereof to provide individual conductive spring-like fingers in said sidewall portion, the outerside of said spring fingers yieldably contacting the panel next adjacent thereto, said panels mounted to compress the outer sides of the sidewall portions towards each other to thereby establish electrical continuity between the panels and through the clip members.

6. A shielding structure as in claim 5 in which the support members have an inverted T-shape and an enlarged upper portion.

7. A shielding structure as in claim 5 in which said clip members surround the panels on all sides, the clip members intersecting each other, and a conductive bar bridging the intersection and conductively bonded to the clip members.

References Cited by the Examiner

UNITED STATES PATENTS

| | | | |
|---|---|---|---|
| 2,825,042 | 2/1958 | Tollefson et al. | 174—35 X |
| 2,825,800 | 4/1958 | Spott | 240—46 X |
| 2,844,644 | 7/1958 | Soule. | |
| 2,877,878 | 3/1959 | Jantsch | 189—88 |

ROBERT K. SCHAEFFER, *Primary Examiner.*

DARRELL L. CLAY, *Assistant Examiner.*